United States Patent [19]

Fischer

[11] Patent Number: 4,903,407
[45] Date of Patent: Feb. 27, 1990

[54] DEVICE FOR MAKING VEGETABLE AND/OR FRUIT CASES FOR FILLING

[76] Inventor: Gérard Fischer, Moulin Rateau, 89260 Saint Martin Sur Oreuse, France

[21] Appl. No.: 184,296
[22] Filed: Apr. 21, 1988
[30] Foreign Application Priority Data Apr. 22, 1987 [FR] France .................. 87 05695

[51] Int. Cl.⁴ .......................................... A47D 43/00
[52] U.S. Cl. ................................................ 30/113.1
[58] Field of Search ............................. 30/113.1, 316

[56] References Cited
U.S. PATENT DOCUMENTS 1,669,960  5/1928  Walsh .
1,977,017 10/1934  Schiller ............................. 30/113.1
2,117,278  5/1938  Ainsworth .
3,384,963  5/1968  Brando ................................. 30/316
4,310,969  1/1982  Connizzaro et al. ............. 30/113.1

FOREIGN PATENT DOCUMENTS 2358839  2/1978  France .
2449412  9/1980  France .

Primary Examiner—Frank T. Yost
Assistant Examiner—Willmon Fridie, Jr.
Attorney, Agent, or Firm—Michael N. Meller

[57] ABSTRACT

A device for preparing cases for filling (2) comprises at least one tubular cutting element (20) and one means for separating the case from the core (52) cut by the element (20) from a fruit or a vegetable. This separating means is comprised of at least one of the following mechanisms:
a transverse blade,
a depression means,
serrations inside the element (20).

13 Claims, 2 Drawing Sheets

DEVICE FOR MAKING VEGETABLE AND/OR FRUIT CASES FOR FILLING

FIELD OF THE INVENTION

The invention relates to a device for preparing cases of edible material and the product thus obtained.

BACKGROUND ART

Cases for filling are known in the food science and technology which are produced from pastry, in particular of the puff pastry type, and on which can be laid salted, sweet, warm or cold comestibles.

It is certain that such canapés made from puff pastry can be suitable for some preparations, but they seem difficult to harmonize with vegetable purées or with fruit compotes.

Accordingly, cases for filling exist which are made from fruits or vegetables, and which are completed with the corresponding or complementary purée or compote.

These cases are obtained by cutting directly a fruit or a vegetable into a cylindrical, cubic or other shape and hollowing manually the same with a spoon.

Such a small-scale method can be practiced at request in small restaurants or at home, but does not have the economy of operation desired in large restaurants or in the industry. The product obtained is not of constant quality, in particular with respect to its dimensions.

OBJECT OF THE INVENTION

Accordingly, the purpose of the present invention is to propose a device for the preparation of cases for filling made of edible material, and in particular of vegetables, fruits, cold meat or cheese, which is characterized in that the separating means is comprised of at least one of the following mechanisms:

a transverse cutting means comprising at least one blade movable in a direction perpendicular to the movement of the tubular cutting element and going through the side wall of the hollow created by the movement of said tubular element;

a depression means cooperating with an upper part of the tubular cutting element for creating a depression permitting the withdrawal of said core when the tubular element is evacuated from the material being cut, and a particular configuration of the inner surface of the tubular element comprising serrations pointing in the direction of withdrawal of the tubular element.

According to one particular embodiment, the device comprises two coaxial inner and outer tubular elements, the inner element being movable with respect to the outer element, and a blade translatable on a support fixed on an arm integral with the outer element, the longitudinal axis of the support being perpendicular to the longitudinal axis of the tubular inner and/or outer elements.

In this embodiment, the blade translates through a slot with bevelled sides provided in the outer tubular element and passes beneath the inner tubular element, its travel distance being shorter than the transverse dimension of the outer tubular element.

The inner tubular element is provided with a stopper which abuts a spacer supported by the rim of the outer tubular element.

The two abutting tubular elements can present a difference in height equal to the thickness of the case for filling.

The tubular elements can also have a slightly conical shape, so as to facilitate the removal of the core and of the case for filling.

The inner and/or outer elements can have a circular, square, or diamond-shaped cross-section, or any other decorative shape.

In another embodiment of the present invention, the device comprises a holding means for the material to be cut—in particular a vegetable or a fruit—comprising a rigid cylinder and a resilient layer on the inside of the cylinder, said holding means being capable of holding the fruit or the vegetable during the action of the tubular cutting element, a piston means being provided which is capable of inserting and/or removing said fruit into and from the holding means.

The cutting edge of the tubular element can comprise serrations.

The blade can comprise several cutting elements which enter the cut-out body at the level of the bottom of the body in places separated from one another. This blade can comprise three or several cutting elements.

The present invention is also concerned with cases made from fruits or from vegetables which are filled to prepare hot or cold comestibles, which cases for filling are produced with a device as according to the present invention.

In a particular embodiment, the cases for filling comprise vertically cut walls and at least one slot substantially parallel to the plane of the bottom.

The advantages of the invention are numerous, starting with the identical appearance of products obtained with a considerable savings of time. The device is reliable and easy to operate. All the desired decorative shapes can be achieved. The portion of cut-out foodstuff or core can be used for making purées or as broken pieces. The product is well suited for freezing or for undergoing vacuum packaging as treatment for preserving the semi-fresh product.

BRIEF DESCRIPTION OF THE DRAWINGS

The invention will be better understood from reading the following description of particular non-limitative embodiments, taken in conjunction with the appended drawings, in which.

DETAILED DESCRIPTION OF THE INVENTION

Figure 1:
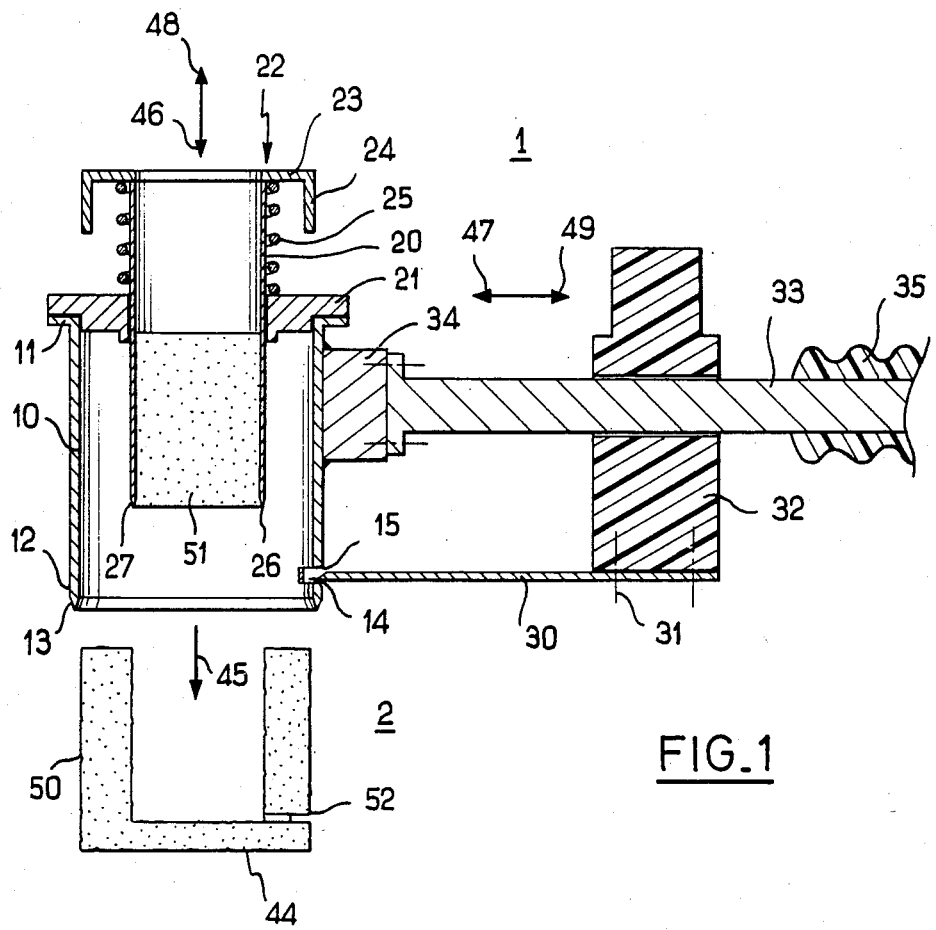
FIG. 1 is a cross-sectional view of a device according to the present invention.

The device 1 comprises a first outer piece generated by rotation 10, of which the upper part is provided with a rim 11 and the lower part 12 with a symmetrically bevelled sharp edge 13.

This same lower part 12 further comprises a slot 14 bevelled at 15. This slot has a length such that the chord of the arc formed by the slot is equal to the "diameter" of the inner piece generated by rotation 20. The latter can slide in a bored spacer 21 supported by the rim 11 of the outer piece generated by rotation 10.

At the upper end 22 there is provided a stopper 23 with an internal bore of the same diameter as the inner piece generated by rotation 20. The height of the stopper corresponds at least to the height of the spring of noncontiguous coils 25 when fully compressed. This spring is mounted to be coaxial with the inner piece generated by rotation 20.

The height of the inner piece generated by rotation 20 is such that when the stopper abuts the upper part of the bored spacer 21, the lower end 26 of the bevelled sharp edge 27 will be at the level of the slot 14. A blade 30 translatable along an axis perpendicular to the longitudinal axis of the inner and/or outer piece generated by rotation is made to penetrate through this slot. This blade is screwed at 31 to a sliding block 32 of a polymeric material mounted on a support 33, the axis of which is necessarily perpendicular to the longitudinal axis of the inner and/or outer pieces generated by rotation. This support is fixed on an arm 34 integral with the outer piece generated by rotation, for example, by soldering.

A handle 35 enables the user to hold the whole device 1.

The operation of such a device consists in taking a thick slice 44 of a fruit or of a vegetable and, after having pulled the blade 30 fully back by sliding backwards the block 32, in applying a load on the slice by pressing the outer piece 10 on this slice as indicated by arrow 45 which results in a first cut 50, and thereafter, but in actual fact almost simultaneously, in pressing the upper part 22 of the inner piece 20 against the urging of the spring as indicated by arrow 46, whereby the material is cut internally and a core 51 is obtained. The third movement consists in translating the block 32 towards the pieces generated by rotation as indicated by arrow 47, thereby pushing the blade 30 through the slot 14 to which it is guided by the bevelled sides 15 and then through the material of which the slice 44 is made. The core is thus cut at its base and this cutting leaves a slot 52 remaining in the side wall. The piece 20 and the core 51 are pulled back as indicated by arrow 48 to the initial position, and so is the blade 30, which is pulled out as indicated by arrow 49. A case for filling 2 is thus obtained.

It is understood that the inner and transverse cutting operations can be reversed. Also, the two pieces generated by rotation can be fixed and a double-action ejector used for evacuating the case and the inner cut-out core. Further, the movable parts can be connected so that only one movement, for example, of the block with its blade, causes the simultaneous movement of the inner piece generated by rotation.

Such modifications should be considered as included in the scope of the present invention.

Further, the shape can be modified as desired and the choice of the materials will be made by those versed in the art so as to comply with the legislation and conform to the standards existing in the field of food technology. The pieces generated by rotation can also be given an angle so as to make them slightly conical, which facilitates the withdrawal of the pieces, of the core and also of the case for filling itself.

The scope of the present invention is not limited to the exemplary embodiments which have just been described, but on the contrary, variations and modifications are included which will be apparent to those versed in the art.

Thus, various shapes can be provided (circular, oval, square, rectangular, trapezoid, starlike and all other polygonal shapes) depending on the shape of the pieces generated by rotation.

One will also understand that such a device can be automated by the use of hydraulic jacks and a control unit. Such an automation can be achieved by a technician skilled in the considered art and does not modify the invention or its result.

Figure 2:
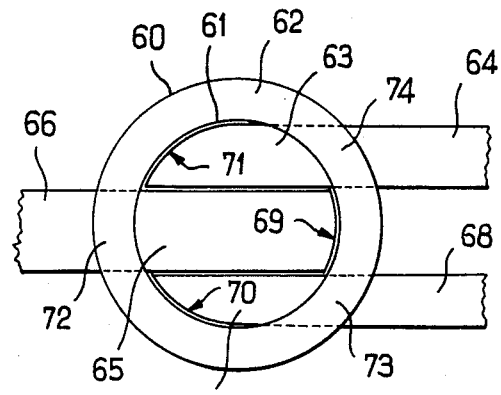
FIG. 2 is a particular construction of the transverse blade.

FIG. 2 shows a particular version of the blade 30 (FIG. 1) operating on a cut-out body 62 defined by the inner surface 61 and the outer surface 60. The blade is divided into three cutting elements 64, 66, 68, the cutting ends 69, 70, 71 of which have gone through the body 62 while producing three slots 72, 73, 74 of a reduced size as compared with the slot 52 of FIG. 1, so that the stability of the cut-out body 62 is increased. The cutting elements 64 and 68 go through the body 62 from the right, and the element 66 from the left until the cutting edges 69, 70, 71 reach the contour of the inner surface 61. The cutting elements 64, 66, 68 can include bevelled edges at least in the portions 63, 65 and 67 to facilitate their movement and provide a guiding means.

Figure 3:
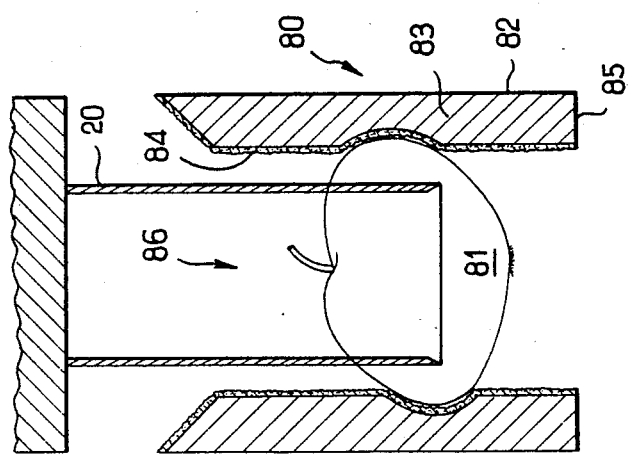
FIG. 3 is a cross-sectional view of the holding means.

FIG. 3 shows the holding means 80 for the fruit or vegetable to be cut.

A rigid cylinder 82 comprises on its inner surface a layer 83 made of foam and covered on its inner surface with a flexible resilient tube 84. The cylinder 82 comprises at its lower end a support ring 85 for holding the layer 83 during the displacement of the fruit 81 by a piston (not illustrated), which firstly pushes the fruit delicately into the opening 86 and withdraws to make room for the tubular cutting element 20 so that the cutting of the fruit 81 may proceed, and then is brought back again after the withdrawal of the element 20 to evacuate the fruit downwards from the holding means 80.

The depression in the layer 83 at the level of the fruit is obviously temporary and ensures a sufficient stability of the fruit while it is cut.

Figure 4:
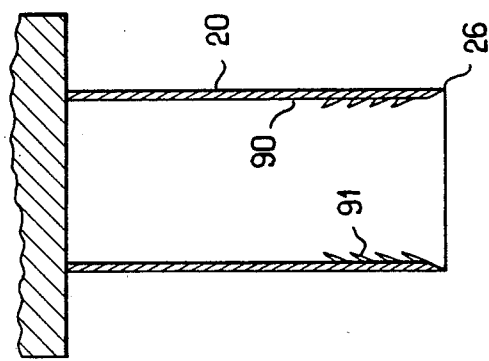
FIG. 4 is a cross-sectional view of the cutting element comprising retention serrations.

FIG. 4 shows the tubular cutting element 20 which bears on its inner surface 90 a plurality of retention serrations 91 which facilitate the extraction of the core cut out by the cutting edge 26.

The effect of these retention serrations can be sufficient in some instances to separate the core from the case and the remainder of the fruit.

Figure 5:
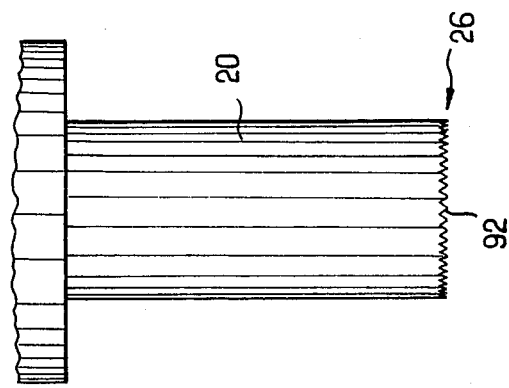
FIG. 5 shows a detail of the cutting edge of the tubular element.

FIG. 5 shows the tubular cutting element 20 as seen from the outside and provides an illustration of the shape of the cutting edge 26 comprising serrations which enable an easier cutting of the skin of some vegetables, in particular of tomatoes.

The cutting tubular element 20 can be moved vertically by simple translation or accompanied by a rotation.

I claim:

1. A device for cutting out primary edible material and in particular cases for filling, comprising:
   means for holding said edible material;
   a first cutting means having a cylindrical wall parallel to a longitudinal axis and a cutting edge at one end thereof, said first cutting means being translatable for a first predetermined distance in a direction parallel to said longitudinal axis for forming a first cut in said material, said first cut defining a side wall of a hollow to be formed in said material; and a second cutting means having a cutting edge at one end thereof, said second cutting means being translatable for a second predetermined distance in a direction perpendicular to said longitudinal axis for forming a second cut in said material, said second cut defining a bottom of said hollow to be formed in said material, whereby said first and second distances are selected such that said first and second cuts intersect to completely sever a first portion of said material from a second portion of said material, said hollow being formed in said second portion of material upon removal of said first portion of material.

2. The device as defined in claim 1, wherein the cutting edge of said first cutting means is circular and the cutting edge of said second cutting means is straight.

3. The device as defined in claim 1, wherein said cylindrical wall of said first cutting means has an inner surface with serrations arranged thereon, said serrations being arranged to pull said first portion of material in a direction opposite to said direction parallel to said longitudinal axis when said first cutting means is translated in said direction opposite to said direction parallel to said longitudinal axis.

4. The device as defined in claim 1, wherein said holding means comprises a third cutting means having a cylindrical wall parallel to said longitudinal axis and a cutting edge at one end thereof.

5. The device as defined in claim 4, wherein said cylindrical wall of said third cutting means has a slot with bevelled sides for receiving said second cutting means.

6. The device as defined in claim 4, further comprising first support means for slidably supporting said first cutting means relative to said third cutting means, and second support means for slidably supporting said second cutting means relative to said third cutting means.

7. The device as defined in claim 6, wherein the cutting edges of said first and third cutting means are circular, and said cylindrical wall of said first cutting means and said cylindrical wall of said third cutting means are coaxial.

8. The device as defined in claim 1, wherein said holding means comprises a rigid cylindrical wall and resilient means applied on an inner surface of said rigid cylindrical wall, said resilient means conforming to the shape of said material in contact therewith.

9. The device as defined in claim 6, further comprising means for stopping translation of said first cutting means in said direction parallel to said longitudinal axis when said first cutting means reaches a first position, said stopping means being fixedly arranged on said first cutting means to abut said first support means when said first cutting means reaches said first position.

10. The device as defined in claim 6, wherein said second support means comprises a rigid arm secured to said third cutting means, and a block secured to said second cutting means, said block being slidably mounted on said rigid arm for translation along said direction perpendicular to said longitudinal axis.

11. The device as defined in claim 1, wherein said cutting edge of said first cutting means comprises serrations.

12. The device as defined in claim 1, wherein said second cutting means comprises first and second blades which translate in opposite directions perpendicular to said longitudinal axis.

13. A device for cutting out primary edible material and in particular cases for filling, comprising:

means for holding said edible material;

a first cutting means having a slightly conical wall with a longitudinal axis and a cutting edge at one end thereof, said first cutting means being translatable for a first predetermined distance in a direction parallel to said longitudinal axis for forming a first cut in said material, said first cut defining a side wall of a hollow to be formed in said material; and a second cutting means having a cutting edge at one end thereof, said second cutting means being translatable for a second predetermined distance in a direction perpendicular to said longitudinal axis for forming a second cut in said material, said second cut defining a bottom of said hollow to be formed in said material, whereby said first and second distances are selected such that said first and second cuts intersect to completely sever a first portion of said material from a second portion of said material, said hollow being formed in said second portion of material upon removal of said first portion of material when said first cutting edge is withdrawn by translation in a direction opposite to said direction parallel to said longitudinal axis.

* * * * *